Sept. 2, 1930.   A. ROHRMANN ET AL   1,774,996
HEATING LID
Filed April 9, 1929   2 Sheets-Sheet 2
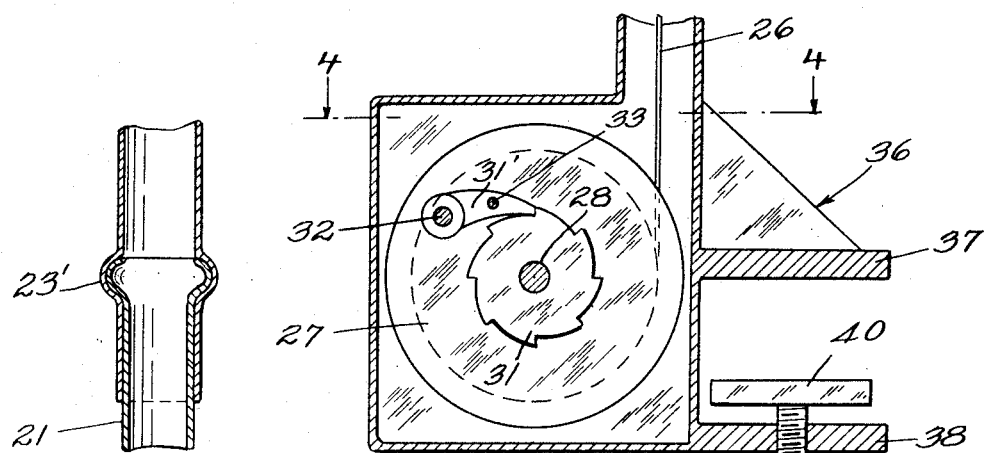
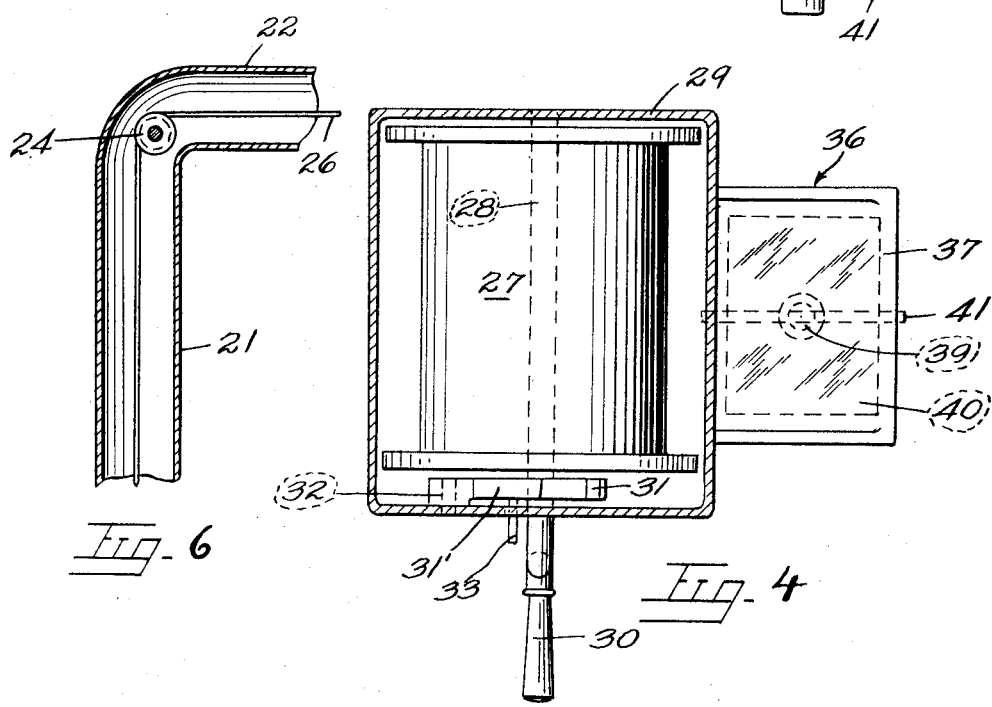

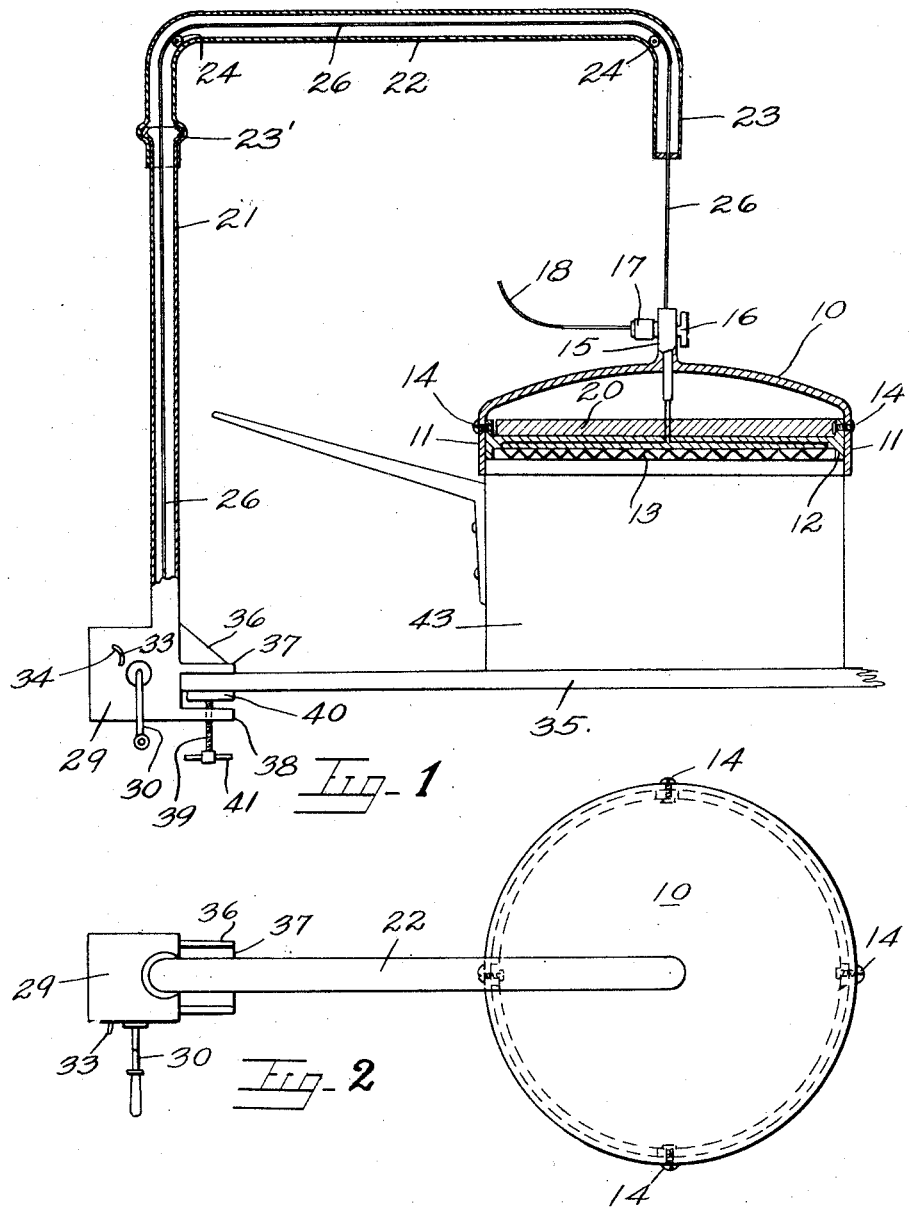

Patented Sept. 2, 1930

1,774,996

UNITED STATES PATENT OFFICE

ALFRED ROHRMANN AND ROBERT I. FOWLER, OF OAKLAND, CALIFORNIA

HEATING LID

Application filed April 9, 1929. Serial No. 353,764.

The invention forming the subject matter of the specification of this application is for an improved auxiliary cooker to be used in conjunction with a cook stove of the usual construction and the cooking utensils commonly used for such purposes.

The primary object of the invention is the provision of means for cooking an article of food by subjecting it to an approximately uniform degree of heat over its entire surface during the cooking process.

A further object of the invention is the provision of an adjustable auxiliary cooker which will form a cover enclosing an article of food and radiate heat thereagainst in conjunction with the heat supplied by the usual cook stove.

A still further object of the invention is to provide a device of the character described which will be of simple construction, easy of manipulation and inexpensive of manufacture.

In the following specification taken together with the accompanying drawings, the preferred embodiment of the invention is described and illustrated. While it is evident that changes may be resorted to in the specific form and relation of the several elements comprising the invention without departing from the spirit thereof, it is intended to claim all of the patentable subject matter thereof in the appended claims.

In the accompanying drawings, Figure 1 is a side view partly in section showing the adjustable support with the auxiliary cooker.

Figure 2 is a top plan view of the auxiliary cooker and the supporting means therefor.

Figure 3 is an end sectional view showing the reeling mechanism for suspending the auxiliary cooker and the clamping means for securing the device to the top of a cook stove.

Figure 4 is a horizontal section taken on line 4—4 of Figure 3.

Figure 5 is a sectional detail view showing the swiveled joint in the upright of the auxiliary cooker support.

Figure 6 is a sectional detail showing the sheave with the supporting cord passing thereover at the angle of the support.

In the usual method of cooking foods in a cooking utensil on the top of a cook stove the heat is applied substantially at the bottom of the food being cooked within the utensil which results, if the article of food be a piece of meat, for instance, in the necessity of turning the meat over frequently during the process of cooking to avoid the bottom portion thereof being over cooked and the upper portion thereof being under cooked, or if the article of food be in the form of grain, such as rice, or the like, or a green vegetable, it becomes necessary to agitate or stir the contents of the utensil frequently in order to avoid the scorching thereof at the bottom.

The device will be found to be especially well adapted to the frying of meats or the like on the top of a cook stove and it will not only subject the article of food being fried to a substantially uniform degree of heat on both the upper and lower side thereof but will effectively retain all the juices and essence of a steak, for instance, by trapping the steam arising therefrom and returning it to the steak thereby cooking the steak through and through while preserving it in a moist juicy state.

For a more comprehensive and clearer understanding of the invention reference may now be had to the following specification and the accompanying drawings in which like reference characters indicate like parts throughout the several figures of the drawings and in which:

Reference character 10 indicates a hood-like structure having depending flange 11 which may be made circular in form and of such dimensions as to form a cover for the usual type of cooking utensil 43. Supported within the cover and preferably adjacent the upper edge of the flange is an electric heating element 12 which may be constructed of any insulating material such as porcelain or the like and is supplied with heating coils 13 which are preferably imbedded in the lower face thereof.

It will be noted (see Fig. 1) that the depending flange extends beyond and below the heating element 12 in order that the flange may receive therein the walls of a cooking utensil and effectively serve as a cover therefor. The heating element 12 may be secured to the flange 11 in any suitable way as by screws 14. An upwardly extending boss 15 is provided on top of the hood-like structure 10 in which is located electric switch 16 and is further provided with socket means for receiving removable plug 17 secured to service wire 18 for supplying electric current through the switch 16, wire 18 and to the heating coils 13. A sheet of heat insulating material such as an asbestos pad 20 is interposed between the heating coils 13 and the top of the hood-like structure 10 to conserve the heat therewithin and deflect it downwardly thereby preventing the over heating of the top of the hood-like structure.

In order that the auxiliary cooker may be adapted to use in conjunction with a cooking utensil positioned over any of the various burners of the usual gas range, for instance, an adjustable support is provided therefor. The support is preferably made of tubular members consisting of upright 21 having cross-arm 22 with downwardly extending portion 23. The cross-arm 22 is pivotally related to upright 21 by their telescopic connection 23' or in any other suitable manner. Sheaves 24 are rotatably mounted in the angles 25 at the juncture of cross-arm 22 and upright 21 and downwardly extending portion 23 for the passage thereover of cable 26 which supports at its outer end the hood-like structure 10 and is secured at its inner end to drum 27 which is affixed to shaft 28 which is journaled in the walls of housing 29. Crank arm 30 is affixed to the outer end of shaft 28 for rotating the drum to raise or lower the hood-like structure 10. Ratchet 31 is affixed to shaft 28 intermediate one of the walls of the housing 29 and the end of the drum 27. Dog 31' is pivotally related to the end wall of the housing 29 as at 32 and is provided with pin 33 which protrudes through slot 34 in the end wall of housing 29 for releasing dog 31' from engagement with ratchet 31 when it is desired to lower the hood-like structure 10 for cooperating as a cover with a cooking utensil upon the top 35 of a cook stove. Bracket 36 having inwardly extending jaws 37 and 38 is provided on the inner wall of housing 29. Bracket 38 having a screw-threaded aperture therethrough for receiving in screw-threaded engagement binding screw 39 which rotatably engages clamping plate 40 at its upper end and is provided at its lower end with cross pin 41 for rotating the screw for clamping the supporting structure to the top of the stove 35.

We claim:

1. An auxiliary cooker comprising a hood having a depending flange for cooperation with a cooking vessel, a heating element within the hood and a bracket for supporting the hood in spaced relation to the top of a cook stove.

2. An auxiliary cooker comprising a hood having a depending flange, a heating element secured within the flange and spaced from the bottom edge thereof, an insulator intermediate the heating element and the top of the hood, a bracket comprising a vertical standard and a swiveled horizontal arm for adjustably supporting the cooker.

3. An auxiliary cooker comprising a hood having a depending flange, a heating coil secured within the hood, a boss projecting upwardly from the hood, an electric switch within the boss, an electric current lead wire operably related to the boss, a wire from the boss to the heating coils and means for suspending the hood from the support.

4. An auxiliary heater comprising a hood having a downwardly extending flange, a heating coil positioned within the hood and secured to the flange, a support comprising a tubular upright and a tubular horizontal supporting arm swiveled thereto, said arm having a downwardly extending portion at its free end, sheaves journaled within the tubes, a housing at the base of the upright tube having a winding drum journaled therein and a supporting cable attached at one of its ends to the drum and passing over the sheaves with the other of its ends attached to the hood and means for rotating the drum.

5. An auxiliary heater comprising a hood having a downwardly extending flange, a heating coil positioned within the hood and secured to the flange, a support comprising a tubular upright and a tubular horizontal supporting arm swiveled thereto, said arm having a downwardly extending portion at its free end, sheaves journaled within the tubes, a housing at the base of the upright tube having a winding drum journaled therein and a supporting cable attached at one of its ends to the drum and passing over the sheaves with the other of its ends attached to the hood and means for rotating the drum, the housing having a clamping bracket for screw-threadedly securing the support to the top of a cook stove.

6. An auxiliary heater comprising a hood, a heating element within the hood, and means for adjustably supporting the hood in a longitudinal plane above the burners of a gas range.

7. An auxiliary heater comprising a hood, a heating element positioned within the hood, a support for supporting the hood intermediate the support and the top of a gas range, said means providing for vertical adjustment of the hood and adjustment thereof in a horizontal plane.

8. An auxiliary heater comprising a hood, a heating element positioned within the hood, a support for supporting the hood intermediate the support and the top of a gas range, said means providing for vertical adjustment of the hood and adjustment thereof in a horizontal plane and clamping means for securing the support to the range.

9. In combination with a gas range, an electric heating element supported above the burners of the gas range in such manner as to provide for vertical adjustment of the heating element and adjustment in a horizontal plane with relation to the burners of the gas range.

10. In combination with a gas range, a swivel support affixed to the range, a cooking utensil cover dependent from the support, a heating element within the cover, means for raising and lowering the cover and means for securing the cover at a definite position intermediate the support and the top of the range.

11. In combination with a gas range, a swivel support affixed to the range, a cooking utensil cover dependent from the support, a heating element within the cover, means for raising and lowering the cover and means for adjustably positioning the cover intermediate the support and the top of the range.

12. In combination with a gas range, a swivel support affixed to the range, a cooking utensil cover dependent from the support, a heating element within the cover, means for raising and lowering the cover and means for securing the cover in adjusted vertical position with relation to the top of the range.

In testimony whereof we have affixed our signatures.

ALFRED ROHRMANN.
ROBERT I. FOWLER.